UNITED STATES PATENT OFFICE.

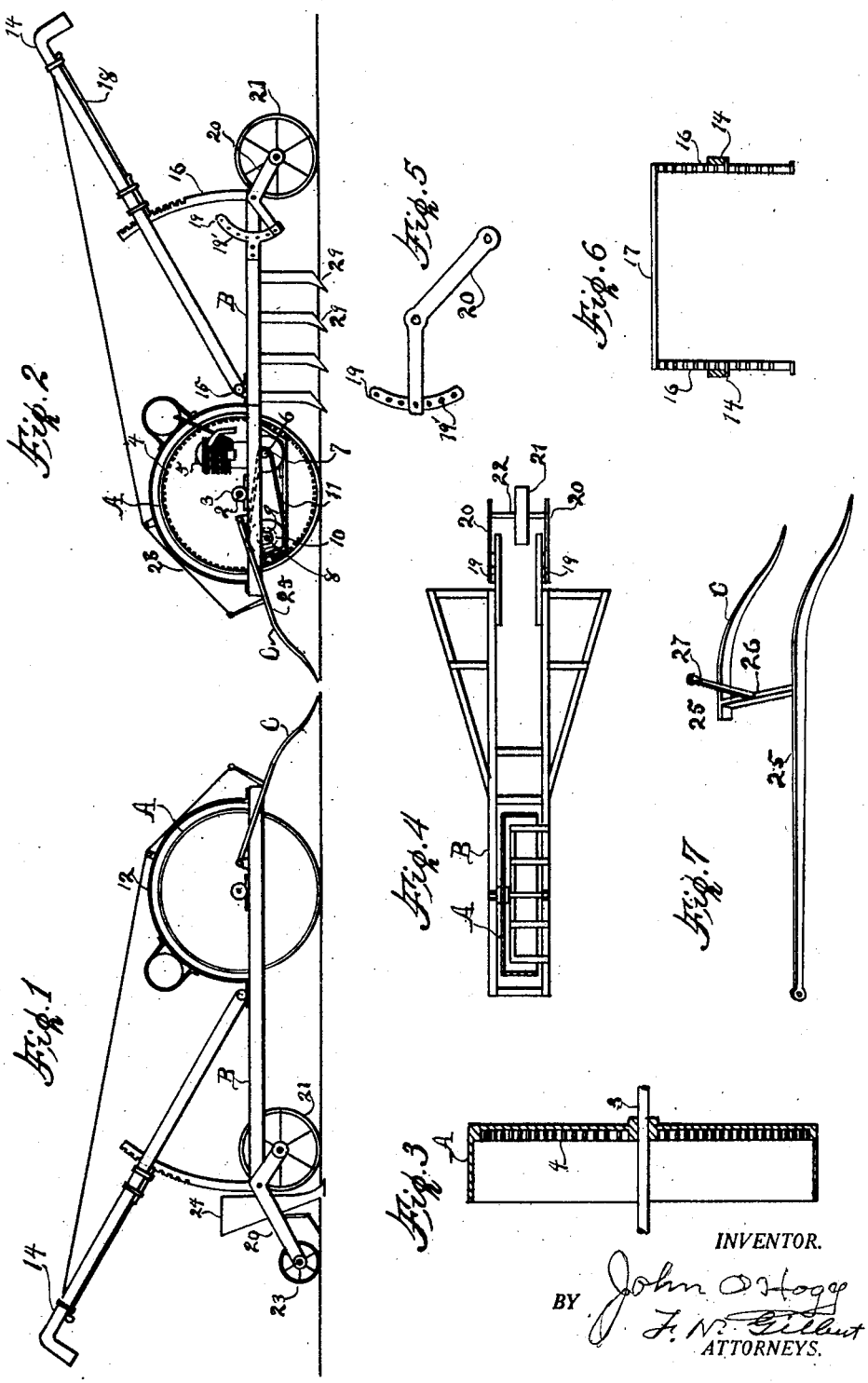

JOHN O. HOGG, OF BINGHAMTON, NEW YORK.

TRACTOR.

1,370,538.   Specification of Letters Patent.   Patented Mar. 8, 1921.

Application filed June 13, 1918. Serial No. 239,757.

*To all whom it may concern:*

Be it known that I, JOHN O. HOGG, a citizen of the United States, residing at Binghamton, in the county of Broome and State of New York, have invented certain new and useful Improvements in Tractors, of which the following is a specification.

My invention relates to improvements in cultivator tractors simple in construction and easy of operation, having for its object to provide a cultivator tractor employing a single tractor wheel properly balanced and provided with operative means located within the tractor wheel for drawing the tractor wheel, which tractor is hand controlled and having mounted thereon a frame on which cultivator teeth are mounted or to which a seed planter may be attached or various cultivating implements, and provided with vertically adjustable guiding handles, and manually operated means disposed in operable relation with the handles for connecting or disconnecting a motor with said tractor wheel to propel said implement, and a rotary support and means to adapt it to cultivating the soil at various depths and with manual operated means for connecting the tractor wheel, to propel the apparatus as desired; a further object is to provide a manually operated adjustable guard for lifting vines and plant branches away from the path of the tractor as the machine moves forward. With these objects in view my invention consists in certain novel features of construction and arrangement of parts, as will be hereinafter fully described and pointed out in the claim, reference being had to the accompanying drawings, in which—

Figure 1 is a perspective view of one form of my device.

Fig. 2, is a perspective view of another form of my device.

Fig. 3 is a front elevation in cross section of a part of my device.

Fig. 4 is a plan view of a fragmentary part of my device.

Fig. 5 is a side view of a detailed part of my device.

Fig. 6 is a front view of a detailed part of my device partly in cross section.

Fig. 7 is a perspective view of a fragmentary part of my device.

The same reference characters denote like parts in each of the several figures of the drawings.

In carrying out my invention I provide a tractor wheel A having the axle 2 mounted upon the body frame B, in socket 3 which wheel has mounted on its inner rim a series of cogs; mounted on said frame by any convenient means and within said tractor wheel, A, I have the engine or motor 5 of any convenient style and propelling in connection therewith the drive shaft 6 on which is mounted a sprocket wheel 7 and having on the inner side or in any convenient position on said frame B, I have the shaft 8 on which is mounted sprocket wheel 9 and also the gear 10 meshing into cogs 4, and between 9 and 6 is mounted the sprocket chain 11; or I may have any other convenient system of gearing connecting the motive power with the tractor wheel. On frame B I have also mounted a shield 12 and on the shield or at any other convenient position, I have mounted a fuel tank 13. On frame B I have pivotally mounted the handles 14, 14 by means of the pivot 15. Mounted on the rear end of frame B I have the parallel cogged guides 16, 16, between which extends the cross brace 17; mounted on the under side of handle 14 I have the clutches 18, 18 adapted to contact with cogs 16; in one form of my invention, I have mounted on the rear of frame B the perforated guides 19; pivotally mounted on frame B, I have the axle supports 20, 20, pivoted, and having contact with guides 19, 19 by means of bolts passing through the openings 19'; and between said axle supports 20, 20 I have the wheel and axle 21 and 22; by which means the elevation of the rear of frame B may be adjusted. In another form of my invention I have the pivoted supports 20, 20 and between the forward ends of which is mounted wheel 21; and between the rear ends, the wheel 23, and also the seed planter 24, said planter being operated by means of appropriate connecting gear between wheel 23 and planter 24; pivotally mounted on the front of the frame B I have the plant lifter or guard C formed of the curved side bars 25 and connected by cross bar 26 in which is mounted the vertical arm 27, the said guide C being in operable connection with the handles by means of the cord 28. When used as a cultivator, I have removably mounted in the frame B the cultivator teeth 29, 29, 29; which may be removed for the use of the machine for other purposes.

In operation I raise or lower the handles by operating the clutch 18 connecting with cogs 16, and thus can easily adjust the depth of the ground cultivated. Also in operation the general depth aside from the manipulation of the handles affecting the same, I can adjust the rotary support 21 by changing the position of the connecting bolts in the openings 19' of guide 19. This tractor is specially useful for and designed for garden use, and in operation, the guard C as the tractor proceeds is adjusted to any particular height, so as to be a means of pushing back the branches and tops of plants and vines so as to prevent them from being crushed by the oncoming tractor wheel, when working between rows of garden plants for which it is specially adapted.

Having thus described my invention, what I claim as new and for which I desire Letters Patent is as follows:—

In a tractor, a frame, a tractor wheel mounted in the tractor frame, an engine mounted in the frame within the wheel, means connecting the engine to the tractor for driving the latter, a guard on the forward end of the frame for clearing the path of the tractor wheel, a wheel support for the rear end of the frame, adjustable handles projecting from the rear end of the frame for manually guiding the tractor and means connecting the guard with the handles whereby the guard and handles are simultaneously adjusted.

In testimony whereof I have affixed my signature in the presence of two witnesses.

JOHN O. HOGG.

Witnesses:
A. L. SCHWAB,
E. M. HOWEY.